(12) United States Patent
Vecchio et al.

(10) Patent No.: US 8,333,225 B2
(45) Date of Patent: Dec. 18, 2012

(54) DEVICE FOR THE REPLACEMENT OF STERILE CONTAINERS CONTAINING CONCENTRATED PRODUCTS IN APPARATUS FOR THE PRODUCTION OF BEVERAGES

(75) Inventors: Paolo Vecchio, Binasco (IT); Dario Sala, Binasco (IT)

(73) Assignee: Gruppo Cimbali S.p.A., Binasco (IT)

( * ) Notice: Subject to any disclaimer, the term of this patent is extended or adjusted under 35 U.S.C. 154(b) by 427 days.

(21) Appl. No.: 12/404,487

(22) Filed: Mar. 16, 2009

(65) Prior Publication Data
US 2009/0236009 A1 Sep. 24, 2009

(30) Foreign Application Priority Data
Mar. 20, 2008 (EP) ..................................... 08425181

(51) Int. Cl.
*B65B 1/04* (2006.01)
(52) U.S. Cl. ......... 141/346; 141/382; 141/383; 141/384
(58) Field of Classification Search .................. 141/383, 141/384, 346, 347, 382; 222/153.04, 325
See application file for complete search history.

(56) References Cited

U.S. PATENT DOCUMENTS

| | | | | |
|---|---|---|---|---|
| 1,770,576 A | * | 7/1930 | Leather | 141/268 |
| 3,688,947 A | * | 9/1972 | Reichenberger | 222/27 |
| 5,072,853 A | * | 12/1991 | Shannon | 222/1 |
| 5,641,012 A | * | 6/1997 | Silversides | 141/383 |
| 5,947,171 A | * | 9/1999 | Woodruff | 141/346 |
| 5,967,383 A | * | 10/1999 | Hidalgo | 222/516 |
| 6,381,146 B1 | * | 4/2002 | Sevier | 361/754 |
| 6,394,773 B1 | * | 5/2002 | Shampoe et al. | 417/550 |
| 2006/0086102 A1 | * | 4/2006 | Dickerson et al. | 62/48.2 |
| 2007/0257059 A1 | | 11/2007 | Stevenson | |
| 2008/0277399 A1 | * | 11/2008 | Burns et al. | 220/560.04 |

FOREIGN PATENT DOCUMENTS
WO 2007/070028 6/2007

OTHER PUBLICATIONS
European Search Report for EP 08425181.8, dated Jul. 28, 2008.

* cited by examiner

*Primary Examiner* — Dinh Q Nguyen
*Assistant Examiner* — Jennifer Gordon
(74) *Attorney, Agent, or Firm* — Nixon & Vanderhye PC

(57) ABSTRACT

Device for the replacement of sterile containers (1) containing concentrated products in apparatus for the production of beverages from these concentrated products, said sterile containers (1) being provided with a union (3) having a one-way valve for dispensing the product, said device comprising a body (5) with a seat (6) for engagement with said union (3), said seat (6) being in fluid connection with the chamber (4) into which the concentrated product and at least the liquid for reconstituting the beverage are supplied, as well as locking means (15, 16, 17) for keeping the said union (3) in position inside said seat (6). Sensor means (18) are provided between said body (5) with the seat (6) for engagement with the union (3) and said locking means, said sensors (18) detecting the relative position of the said locking means (15, 16, 17) with respect to the body (5) and emitting a corresponding signal.

6 Claims, 3 Drawing Sheets

DEVICE FOR THE REPLACEMENT OF STERILE CONTAINERS CONTAINING CONCENTRATED PRODUCTS IN APPARATUS FOR THE PRODUCTION OF BEVERAGES

This application claims priority to European Application No. 08425181.8, filed 20 Mar. 2008, the entire contents of which are hereby incorporated by reference.

FIELD OF THE INVENTION

The present invention relates to a device for the replacement of sterile containers containing concentrated products in apparatus for the production of beverages from these concentrated products, said sterile containers being provided with a union having a one-way valve for dispensing the product, said device comprising a body with a seat for engagement with said union, said seat being in fluid connection with the chamber into which the concentrated product and at least the liquid for reconstituting the beverage are supplied, as well as locking means for keeping the said union in position inside said seat.

BACKGROUND OF THE INVENTION

In the sector relating to apparatus for the production of beverages, for example coffee, tea, chocolate, in place of the conventional soluble products in powder or granular form, the use of fluid concentrated products is becoming increasingly widespread.

One reason for the spread of these concentrated products consists, in particular, in the improved quality in terms of taste and aroma of the beverage produced, but also in the possibility of being able to use sealed and sterile containers made, in particular, but not exclusively, in the form of a flexible bag.

According to the known art, the containers of the type indicated above are provided with a pipe for discharging the concentrated product, which has a predetermined length and one end of which has a union provided with a one-way valve which allows the product to flow out and prevents the backflow of contaminated liquid towards the inside of the container.

Also according to the known art, the union of the discharge pipe of the container is connected to a seat which is designed to receive it sealingly and is connected to the beverage reconstitution chamber inside which, besides the concentrated product, at least the reconstitution liquid, generally hot or cold water, flows.

The concentrated product is then pumped into this beverage reconstitution chamber by means of a pump, in particular a peristaltic pump operating along the flexible pipe section situated between the sterile container and the union with the one-way valve.

Since, once the concentrated product present in the sterile container has been used up, the container must be replaced with another full container, according to the known art, the union of the pipe must be able to be inserted inside the seat connected to the beverage reconstitution chamber and removed from it, while ensuring a safe sealed connection.

In fact, should the union not be correctly inserted inside the associated seat, leakage of the concentrated product outside of the beverage reconstitution chamber may occur during operation of the apparatus. This leaking product, since it is dispersed inside the apparatus, has an adverse effect on the hygienic conditions of the process and damages operation of the apparatus.

SUMMARY OF THE INVENTION

The problem underlying the present invention is therefore that of overcoming the abovementioned drawback.

The object of the present invention is to provide a device which allows detection as to correct insertion of the union with the one-way valve inside the associated seat of the beverage reconstitution chamber.

This object is achieved with a device for the replacement of sterile containers containing concentrated products in apparatus for the production of beverages from these concentrated products, said sterile containers being provided with a union having a one-way valve for dispensing the product, said device comprising:
  a body with a seat for engagement with said union, said seat being in fluid connection with a chamber into which the concentrated product and at least the liquid for reconstituting the beverage are supplied, as well as
  locking means for keeping the said union in position inside said seat,
wherein sensor means are provided between said body with the seat for engagement with the union and said locking means, said sensor means detecting the relative position of the said locking means with respect to the body and emitting a corresponding signal.

BRIEF DESCRIPTION OF THE DRAWINGS

The invention will now be described in greater detail with reference to an example of embodiment thereof provided by way of a non-limiting example and illustrated in the accompanying drawings in which.

DESCRIPTION OF THE PREFERRED EMBODIMENT

Figure 1:
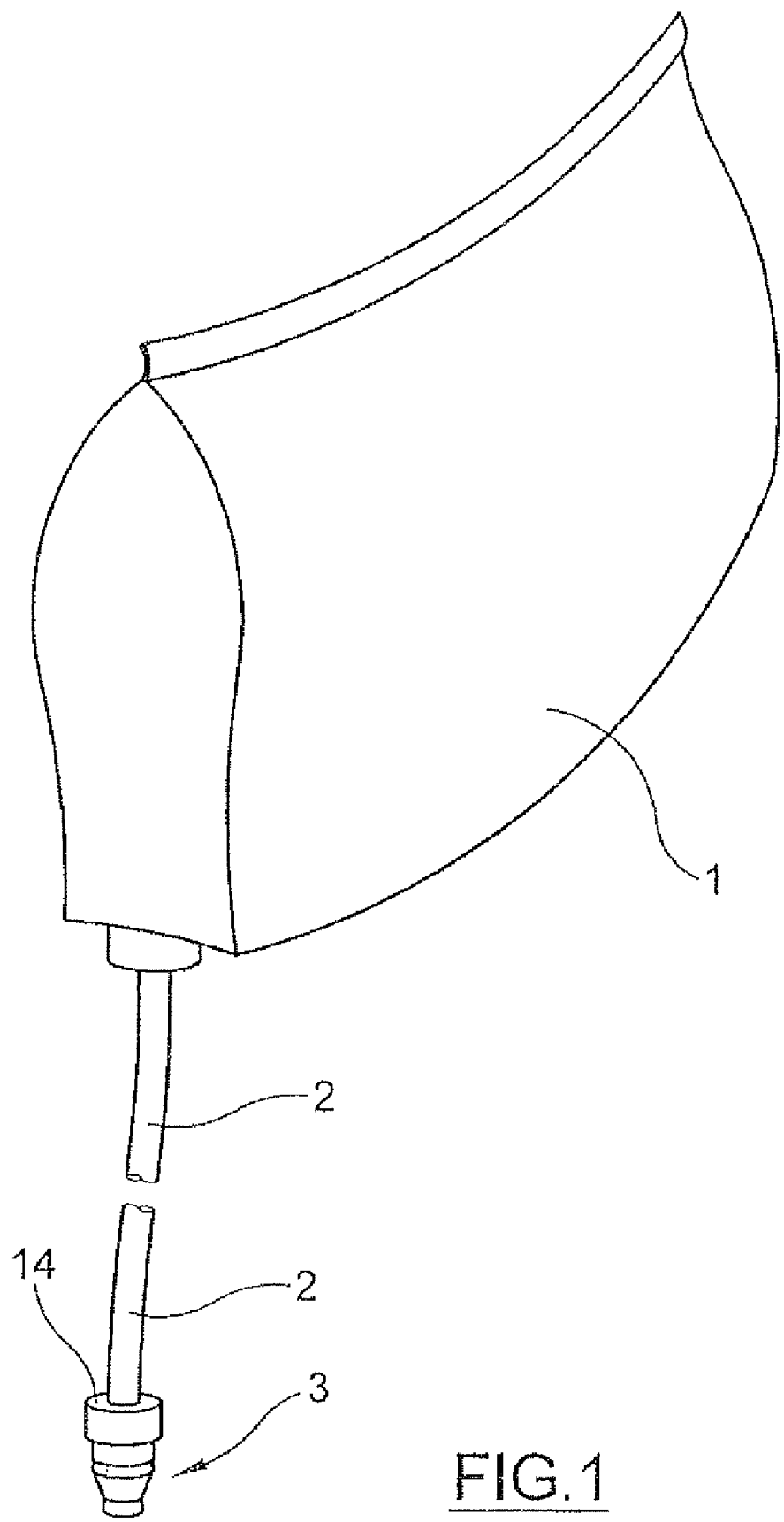
FIG. 1 shows a perspective view of a sterile container in the form of a flexible bag, intended for concentrated products, in accordance with the invention.
Figure 2:
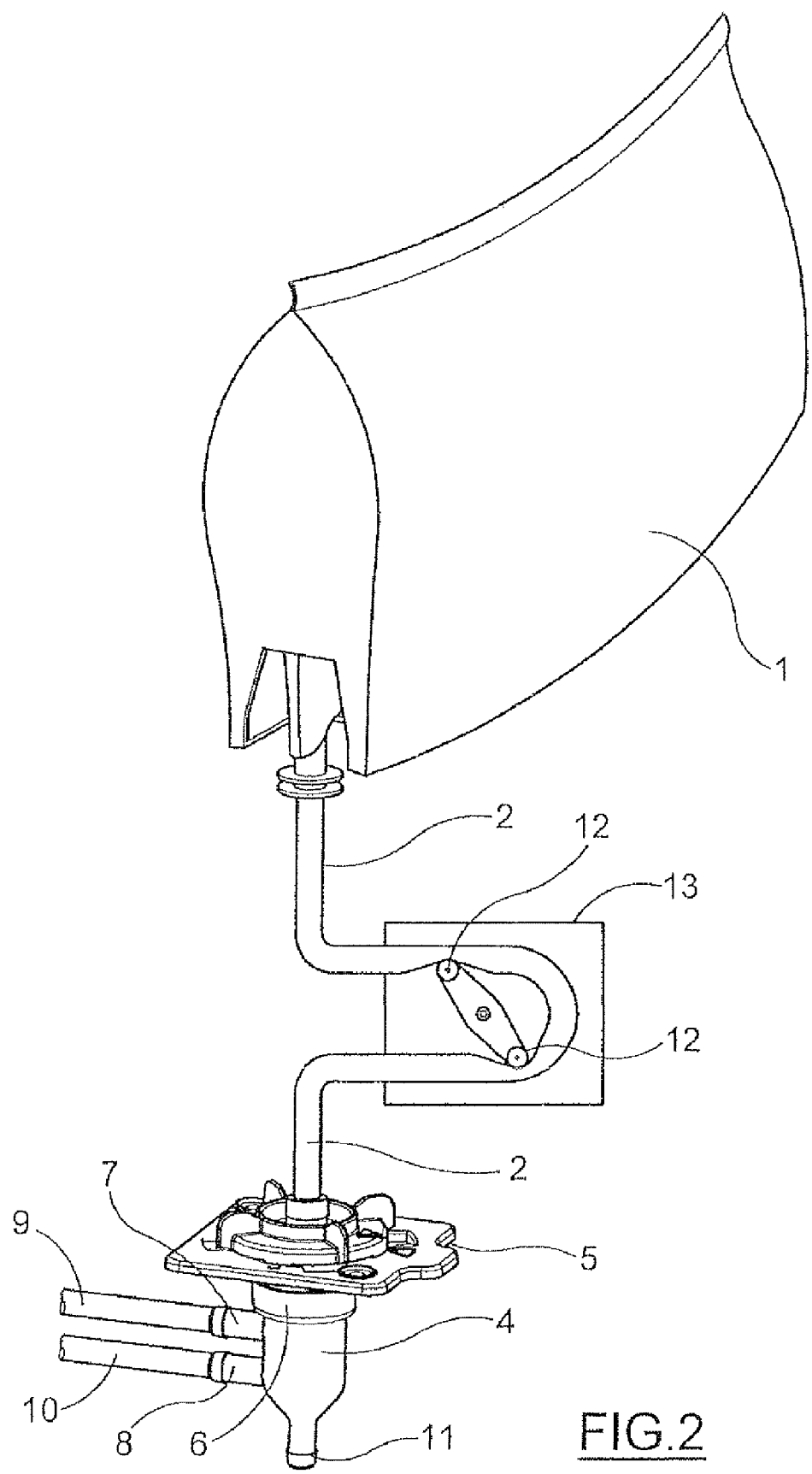
FIG. 2 shows a schematic perspective view of part of the apparatus for reconstitution of the beverage, in accordance with the invention.
Figure 3:
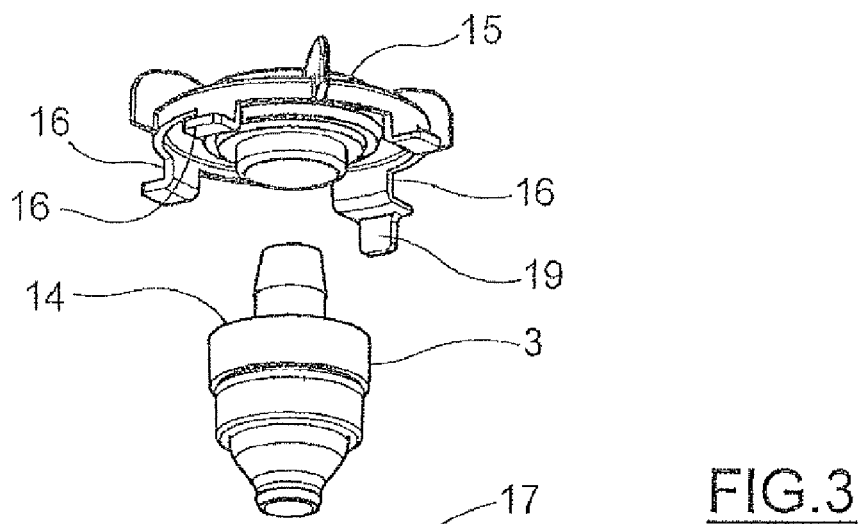
FIG. 3 shows an exploded perspective view of the union and the associated seat for connection to the beverage reconstitution chamber with the locking means according to the invention.
Figure 3:
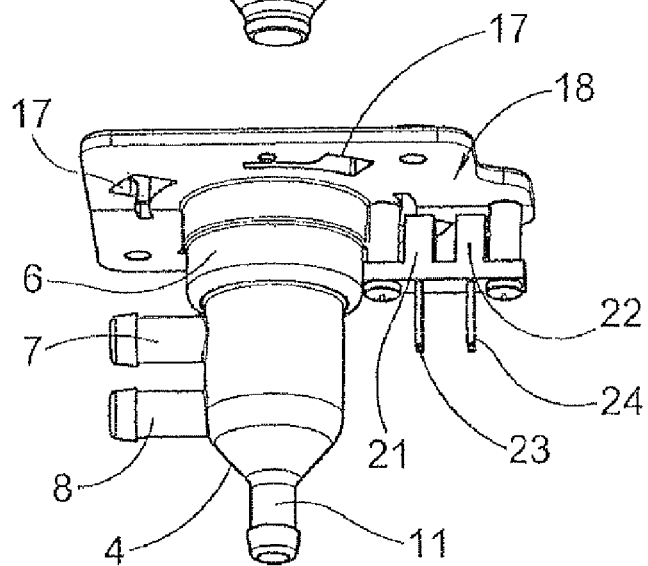
Figure 4:
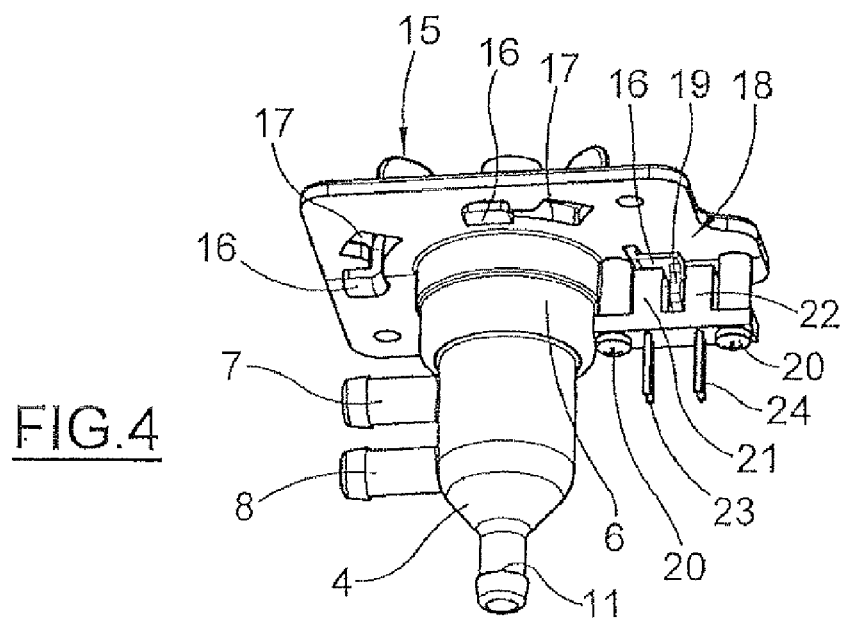
FIG. 4 shows a schematic perspective view of the beverage reconstitution chamber with the means for locking the union, positioned in the correct connected condition.

With reference to the abovementioned figures and in particular to FIG. 1, a container in the form of a flexible bag is denoted by 1. It contains internally, in a sterile condition, a concentrated preparation for the formation of a beverage, for example coffee, tea or chocolate. A section of flexible pipe 2 extends from the sterile bag 1 and terminates in a union 3 for dispensing the concentrated product contained in the bag 1, in a known manner, into a beverage reconstitution chamber denoted by 4.

The latter, in the non-exclusive example shown in the drawings, is connected to a support plate 5 via a hollow seat 6 inside which the union 3 for supplying the concentrated product is inserted.

The chamber 4 is also provided with unions 7 and 8 for supplying the liquid for reconstitution of the beverage, usually hot or cold water, and if necessary steam for heating the beverage, when required, by means of respective pipes 9 and 10.

The same chamber 4 is provided with a bottom union 11 for connection to the pipe for dispensing the beverage, in a conventional manner not shown.

The flexible pipe section 2 is inserted between the rollers 12 of a conventional peristaltic pump 13 which, in a conventional manner, supplies a prescribed amount of concentrated product from the bag 1 into the beverage reconstitution chamber 4 following commands imparted to the apparatus by a control unit (not shown).

The union 3 of the flexible pipe comprises, in a known and conventional manner, a one-way valve (not shown) which prevents any backflow of contaminated liquid towards the inside of the bag 1.

This union 3 is kept in position inside the seat 6 by means of locking means which comprise an annular contact surface 14, formed on the union 3, and a collar—denoted overall by 15—mounted coaxially with the union 3 so as to engage axially on the contact surface 14, while being free to rotate about the said union.

The collar 15 is provided with engaging members 16 intended to engage inside shaped openings 17 in the plate 5 supporting the chamber 4.

The engaging members 16, in the example shown, form, together with the shaped openings 17, a conventional reversible connection of the bayonet type.

In accordance with the invention, the device comprises sensor means 18 by means of which it is detected whether the locking means 16 and 17 have performed correct and complete connection of the union 3 inside the seat 6 in order to prevent the dispersion of concentrated product outside the chamber 4.

These sensor means 18 comprise a first locating element 19 made of opaque material and projecting from the collar 15 towards the plate 5. In the example shown in the drawings this element 19 consists of a lug integral with one of the engaging members 16 of the collar 15.

The same sensor means 18 also comprise a second locating element which, in a preferred embodiment, comprises an optical device fixed by means of screws 20 to the plate 5, on the opposite side to where the collar 15 operates. In the example shown in the drawings, the optical device consists of a photoelectric fork member with an emitter 21 and a receiver 22, the terminals of which are denoted by 23 and 24 respectively.

Positioning of the optical device 21, 22 on the plate 5 and the locating element 19 made of opaque material on the locking collar 15 is performed so that this opaque element 19 of the collar 15 is situated between the emitter 21 and the receiver 22 of the photoelectric fork member only when the union 3 is correctly positioned inside the seat 6 and the collar 15 is fully tightened on the plate 5.

In these conditions, when the used bag 1 is replaced with a full bag, interruption of the optical ray between the emitter 21 and the receiver 22 generates an enable signal which is detected at the terminals 24 of the receiver 22 and used to enable the peristaltic pump 13 and therefore the apparatus for preparing the beverage.

Should the union 3 not be correctly inserted inside the seat 6, the collar 15 would not be able to position the locating element 19 inside the photoelectric fork member and no useful signal would be detected with consequent blocking of the apparatus.

Although the preferred solution for the constructional design of the sensor means 18 is that of a photoelectric cell, alternatively correct positioning of the union 3 in the seat 6 could be detected by means of an electrical contact actuated by the locating element 19 or by means of proximity sensors without thereby departing from the scope of the invention as described above and claimed below.

What we claim is:

1. A device for the replacement of sterile containers containing concentrated products in apparatus for the production of beverages from these concentrated products, said sterile containers being provided with a union having a one-way valve for dispensing the product, said device comprising:

a body with a seat for engagement with said union of the sterile container containing concentrated products, a chamber constructed for reconstituting a beverage and in fluid connection with said seat and with a source of liquid for reconstituting the beverage, locking means for keeping the said union in position inside said seat, said locking means comprising an annular contact surface on the union and a collar engaging with said contact surface, said collar being suitable to rotate about the union and provided with engaging members engaging with corresponding seats provided in said body, sensor means provided between said body with the seat for engagement with the union and said locking means, said sensor means detecting the relative position of the said locking means with respect to the body and emitting a corresponding signal, said sensor means comprising a first locating element associated with the said locking means and a second locating element associated with said body, said first locating element comprising a bar-like lug made of opaque material and projecting from the said collar and directed towards the said body and interacting with said second element in order to generate a signal representing the correct relative position of said union and said seat.

2. A device according to claim 1, wherein the said engaging members and said seats on the body form a bayonet joint.

3. A device according to claim 1, wherein said second locating element comprises a photoelectric cell positioned on said body so as to interfere with said first locating element, when said locking means are situated in the position corresponding to exact and complete connection between said union and said seat, and so as to emit a corresponding signal.

4. A device according to claim 1, wherein the sterile container for the concentrated product is in the form of a flexible bag.

5. A device according to claim 1, wherein the chamber into which the concentrated product and at least the liquid for reconstituting the beverage are supplied is integral with the body provided with a seat for engagement with the union of the container.

6. A device according to claim 1, wherein the said union is connected to the sterile container by means of a flexible pipe section.

* * * * *